United States Patent
Demers

(10) Patent No.: US 9,702,051 B2
(45) Date of Patent: Jul. 11, 2017

(54) NON-CAPACITIVE OR RADIO FREQUENCY-TRANSPARENT MATERIALS WITH ANODIZED METAL APPEARANCE

(71) Applicant: Apple Inc., Cupertino, CA (US)

(72) Inventor: Brian P. Demers, San Jose, CA (US)

(73) Assignee: Apple Inc., Cupertino, CA (US)

(*) Notice: Subject to any disclaimer, the term of this patent is extended or adjusted under 35 U.S.C. 154(b) by 424 days.

(21) Appl. No.: 14/190,018

(22) Filed: Feb. 25, 2014

(65) Prior Publication Data
US 2015/0167193 A1 Jun. 18, 2015

Related U.S. Application Data

(60) Provisional application No. 61/917,278, filed on Dec. 17, 2013.

(51) Int. Cl.
| | |
|---|---|
| *B32B 15/04* | (2006.01) |
| *B05D 3/00* | (2006.01) |
| *C25D 11/02* | (2006.01) |
| *C25D 11/16* | (2006.01) |
| *C25D 11/24* | (2006.01) |
| *B32B 37/24* | (2006.01) |

(52) U.S. Cl.
CPC .......... *C25D 11/022* (2013.01); *C25D 11/16* (2013.01); *C25D 11/24* (2013.01); *B32B 2037/246* (2013.01); *B32B 2255/20* (2013.01); *B32B 2307/202* (2013.01); *B32B 2307/416* (2013.01)

(58) Field of Classification Search
USPC ....... 428/426, 428, 432, 433, 434, 688, 689, 428/697, 698, 699, 701, 702; 427/402, 427/419.1, 419.2
See application file for complete search history.

(56) References Cited

U.S. PATENT DOCUMENTS

| | | |
|---|---|---|
| 3,632,395 A | 1/1972 | Dyson |
| 4,150,942 A | 4/1979 | Holliger et al. |
| 4,335,173 A | 6/1982 | Caraballo |
| 4,681,666 A * | 7/1987 | Potter .................. C25D 11/04 205/118 |
| 5,234,729 A | 8/1993 | Wheatley et al. |

(Continued)

FOREIGN PATENT DOCUMENTS

| | | |
|---|---|---|
| WO | WO2012137498 | * 10/2012 |
| WO | 2013192579 A1 | 12/2013 |

OTHER PUBLICATIONS

PCT Application No. PCT/US2015/013901—International Search Report & Written Opinion dated May 14, 2015.

*Primary Examiner* — Lauren R Colgan
(74) *Attorney, Agent, or Firm* — Downey Brand, LLP

(57) ABSTRACT

Composite structures that have an appearance of an anodized bulk metal but that is non-capacitive and/or radio frequency (RF) transparent are disclosed. The composite structure can be part of an enclosure of an electronic device. The composite structure can give the enclosure a metallic look without interfering with the functioning of some electronic components of the electronic device, such as RF antennas, touch pads and touch screens. Some embodiments involve forming a metal oxide layer and depositing a non-capacitive layer on the metal oxide layer. Some embodiments involve forming an imitation metal oxide layer and depositing a non-capacitive layer on the imitation metal oxide layer.

20 Claims, 16 Drawing Sheets

(56) References Cited

U.S. PATENT DOCUMENTS

| | | | |
|---|---|---|---|
| 6,696,553 B1 | 2/2004 | Korte et al. | |
| 7,347,924 B1* | 3/2008 | Yoon | C25D 5/022 |
| | | | 205/171 |
| 8,031,174 B2 | 10/2011 | Hamblin et al. | |
| 9,300,036 B2* | 3/2016 | Misra | H01Q 1/42 |
| 9,438,710 B2 | 9/2016 | Demers et al. | |
| 2004/0005471 A1* | 1/2004 | Sugita | B05D 5/067 |
| | | | 428/469 |
| 2004/0120060 A1* | 6/2004 | Aihara | G02B 5/0858 |
| | | | 359/883 |
| 2005/0072189 A1* | 4/2005 | Tudryn | B81C 3/001 |
| | | | 65/36 |
| 2006/0187551 A1* | 8/2006 | Huang | G02B 5/0858 |
| | | | 359/582 |
| 2007/0054436 A1* | 3/2007 | Hirakata | G02B 5/201 |
| | | | 438/69 |
| 2007/0064446 A1* | 3/2007 | Sharma | G02B 5/0221 |
| | | | 362/618 |
| 2008/0026221 A1 | 1/2008 | Vincent et al. | |
| 2009/0141334 A1 | 6/2009 | Dean et al. | |
| 2009/0237782 A1* | 9/2009 | Takamatsu | B32B 17/10 |
| | | | 359/359 |
| 2010/0086774 A1* | 4/2010 | Varaprasad | B32B 17/10036 |
| | | | 428/336 |
| 2011/0089792 A1* | 4/2011 | Casebolt | B29C 45/14311 |
| | | | 312/223.2 |
| 2011/0097506 A1 | 4/2011 | Shah et al. | |
| 2011/0214993 A1 | 9/2011 | Akana et al. | |
| 2013/0050636 A1* | 2/2013 | Fukagawa | G02B 1/115 |
| | | | 351/159.01 |
| 2014/0034115 A1* | 2/2014 | Sato | H01L 31/0392 |
| | | | 136/252 |

\* cited by examiner

NON-CAPACITIVE OR RADIO FREQUENCY-TRANSPARENT MATERIALS WITH ANODIZED METAL APPEARANCE

CROSS REFERENCE TO RELATED APPLICATIONS

This application claims priority to U.S. provisional application No. 61/917,278 filed Dec. 17, 2013, entitled "NON-CAPACITIVE OR RADIO FREQUENCY-TRANSPARENT MATERIALS WITH ANODIZED METAL APPEARANCE," which is incorporated herein by reference for all purposes.

FIELD

This disclosure relates generally to outer housings and covers for electronic devices. In particular, disclosed herein are methods for providing housings and covers for electronic devices that have a metallic appearance and that are non-capacitive and radio transparent.

BACKGROUND

Many computing devices have outer housings and coverings that include metallic surfaces giving the devices an aesthetically pleasing and durable look and feel. Computing devices can also include any of a number of complex functional components. For example, many laptops include capacitive touch pads that allow a user to control movement of a cursor. Mobile phones and tables have radio frequency antennas that allow communication via radio frequency transmission.

One design challenge associated with computing devices is maintaining a sleek and consistent appearance of a metallic outer enclosure for housing the various complex internal components. Since metal is not radio frequency transparent, metal is generally a poor choice of material when the devices utilize electromagnetic wave transmission, such as radio frequency transmission for communication. In addition, metal is generally a high capacitive material, and as a result, not used to cover capacitive touch pads, touch screens and other capacitive sensors. Accordingly, portions of the housings that cover antennas and touch sensors are made of a non-metallic material such as plastic or glass. Unfortunately, plastic surfaces and glass surfaces have different visual qualities than metallic surfaces, which result in a visible break in the metallic surface of the housing. This visible break can detract from the smooth and continuous look of the metallic housing.

SUMMARY

This paper describes various embodiments that relate to anodized metal appearing composite structures and methods for forming the same.

According to one embodiment, a method of forming a composite structure that is substantially non-electrically capacitive and having an anodized metal appearance is described. The method includes converting a portion of a metal layer to a metal oxide layer that overlays an unconverted portion of the metal layer at a first surface of the metal oxide layer. The unconverted portion of the metal layer is viewable through the metal oxide layer. The method also involves exposing the first surface of the metal oxide layer by removing the unconverted portion of the metal layer. The method further involves forming the composite structure by applying an optically reflective layer that is substantially non-electrically capacitive on the exposed first surface of the metal oxide layer. The composite structure has the appearance of the anodized metal when viewed from a second surface of the metal oxide layer opposite the first surface.

According to another embodiment, a part is described. The part includes a substantially non-electrically capacitive substrate. The part also includes an anodized metal appearing and substantially non-electrically capacitive composite structure disposed on the substrate. The composite structure includes a substantially translucent metal oxide layer having a first surface proximate the substrate. The composite structure also includes an optically reflective layer disposed on a second surface of the metal oxide layer opposite the first surface. The optically reflective layer is substantially non-electrically capacitive. The composite structure has an appearance of an anodized metal when viewed from the first surface of the metal oxide layer.

According to an additional embodiment, an anodized metal appearing and substantially non-electrically capacitive composite structure disposed on the substrate is described. The composite structure includes a substantially translucent metal oxide layer having a first surface proximate the substrate. The composite structure also includes an optically reflective layer disposed on a second surface of the metal oxide layer opposite the first surface. The optically reflective layer is substantially non-electrically capacitive. The composite structure has an appearance of an anodized metal when viewed from the second surface of the metal oxide layer.

According to a further embodiment, a method of forming a structure having an anodized metal appearance and that is substantially non-electrically capacitive is described. The method includes forming an anodized metal appearing material by applying an optically reflective coating that is substantially non-electrically capacitive on a first surface of an imitation metal oxide layer. The imitation metal oxide layer is substantially translucent such that the optically reflective coating is visible through the imitation metal oxide layer from a second surface of the imitation metal oxide layer. The method also includes adhering a protective cover on the second surface of the imitation metal oxide layer. The protective cover is substantially translucent such that the anodized metal appearing composite material is visible therethrough.

According to an additional embodiment, a method of forming a composite structure having an anodized metal appearance and that is substantially radio frequency (RF) transparent is described. The method includes converting a portion of a metal layer to a metal oxide layer that overlays an unconverted portion of the metal layer at a first surface of the metal oxide layer. The unconverted portion of the metal layer is viewable through the metal oxide layer. The method also includes exposing the first surface of the metal oxide layer by removing the unconverted portion of the metal layer. The method further includes forming the composite structure by applying an optically reflective layer that is substantially RF transparent on the exposed first surface of the metal oxide layer. The composite structure has the appearance of the anodized metal when viewed from a second surface of the metal oxide layer opposite the first surface.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
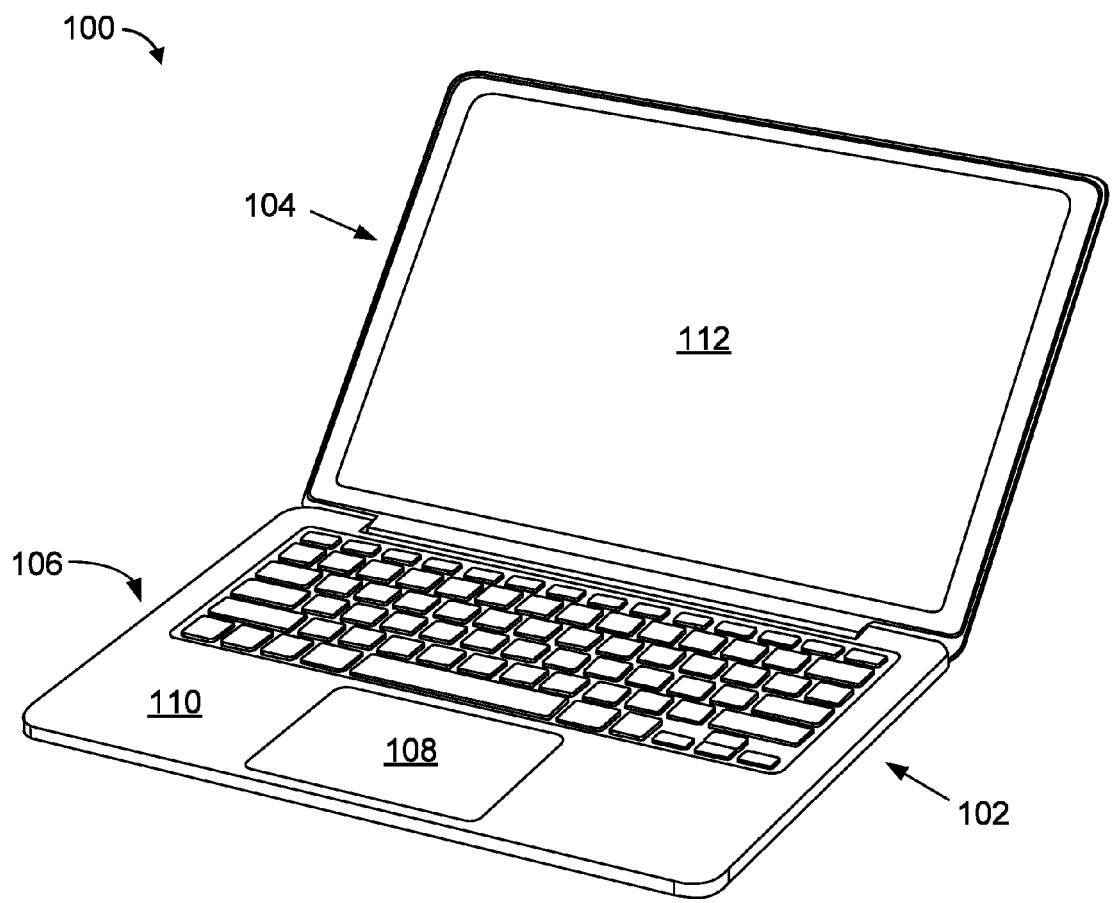
FIG. 1 shows a perspective view of laptop computer, which includes non-capacitive materials that can be made to appear metallic using methods described herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to composite materials that have the visual appearance of an anodized metal surface but have different operative properties than an anodized bulk metal substrate. For example, the composite materials can have different capacitance (electrical and/or thermal) and/or radio frequency (RF) properties than an anodized bulk metal substrate. The anodized metal appearing composite structures can be formed on exterior portions of enclosures for electronic devices. The anodized metal appearing composite structures can cover electronic components, such as capacitive touch sensors, touch pads and RF windows, without interfering with the operation of the electronic components. The anodized metal appearing composite structures can be formed adjacent to anodized metal portions of a part giving the part a continuous metal appearance.

In a particular embodiment, the anodized metal appearing composite structure includes a metal oxide layer and an optically reflective layer disposed on a surface of the metal oxide layer. The metal oxide layer can be substantially translucent allowing incident light to shine through the metal oxide layer and reflect off the optically reflective layer, giving the composite structure an appearance of an anodized metal.

In another embodiment, the anodized metal appearing structure includes an imitation metal oxide layer and an optically reflective layer disposed on a surface of the imitation metal oxide layer. The imitation metal oxide layer can be made of any suitable material having a visual appearance of a metal oxide material. As with the metal oxide layer, the imitation metal oxide layer can be substantially translucent allowing incident light to shine through and reflect off the optically reflective layer, giving the composite structure an appearance of an anodized metal. In some embodiments, a protective layer, such as a layer of plastic or glass, is adhered to the metal oxide layer or the imitation metal oxide layer.

The anodized metal appearing composite structures are well suited for providing protective and attractive metallic looking surfaces to visible portions of consumer products. For example, the anodized metal appearing composite structures can be manufactured as exterior portions of enclosures and casings for electronic devices, such as those manufactured by Apple Inc., based in Cupertino, Calif. In some embodiments, the metallic looking surfaces are part of a metal housing. In other embodiments, the metallic looking surfaces make up substantially an entire surface of a housing. In some embodiments, the metallic looking surfaces are part of a touch pad or track pad of an electronic device. In some embodiments, the metallic looking surfaces are part of a RF window of an electronic device.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 shows a perspective view of laptop computer 100, which includes base portion 102 and lid 104. Base portion 102 has top surface 106, which includes track pad 108 surrounded by top case 110. Track pad 108 includes a tactile sensor that is sensitive to a user's finger. The sensor translates the motion and position of the user's finger to a relative position of a pointer displayed on screen 112. In some cases, track pad 108 operates using capacitive sensing, which requires that the top surface of track pad 108 be made of non-conductive or non-capacitive material such as glass or plastic. The top surface of track pad 108 can be smooth and polished, or it can be textured to have an etched look and feel. In some cases, top case 110 is made of metal such as aluminum or aluminum alloy. Thus, top surface 106 can have a metallic surface portion corresponding to metal top case 110 and a non-conductive surface portion corresponding to track pad 108. Methods described herein can be used to provide track pad 108 a metallic appearance that matches surrounding metallic top case 110 while still having the necessary non-conductive surface for proper track pad operation.

Figure 2:
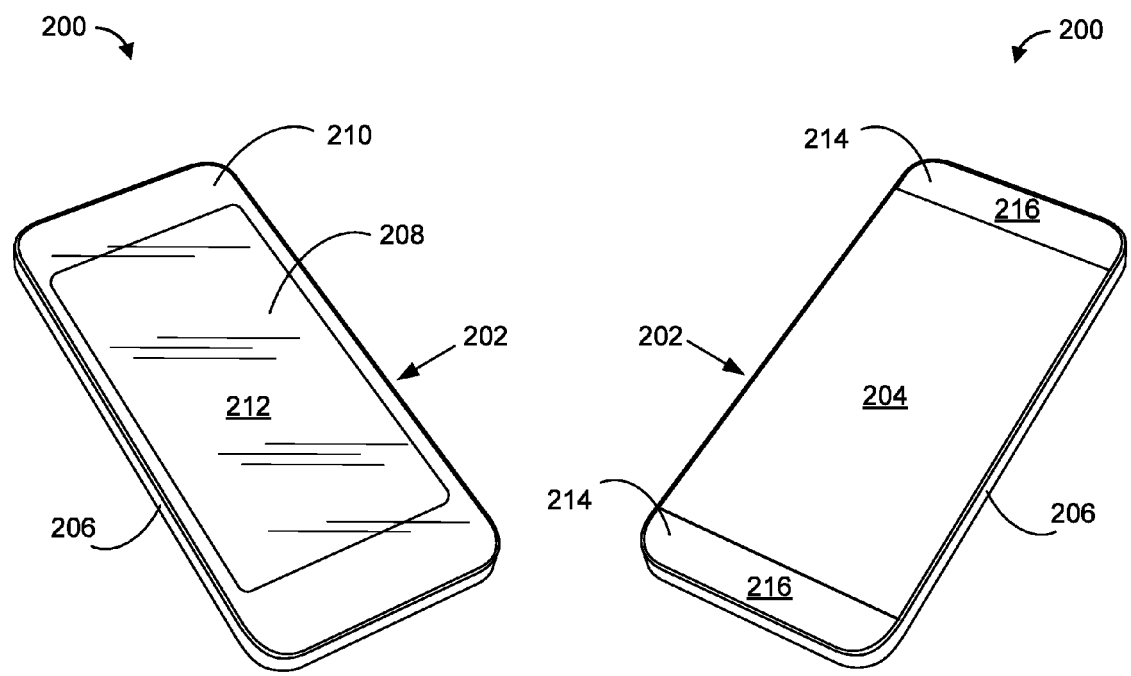
FIG. 2 shows perspective top and bottom views of a mobile phone, which includes non-capacitive materials and RF-transparent materials that can be made to appear metallic using methods described herein.

In some embodiments, the metallic looking surfaces are part of a display screen or an RF transparent window for an electronic device. FIG. 2 shows perspective top and bottom views of mobile phone 200. Mobile phone 200 includes housing 202 designed to house internal electronic components of mobile phone 200. Housing 202 includes back portion 204 and side portions 206 that are made of metal, such as aluminum or aluminum alloy. Mobile phone includes display 208, which displays output of mobile phone 200, such as graphic images and text. Display 208 can be a touch screen display that collects touch input from a user. Display 208 is surrounded by frame portion 210 that typically does not display images or text. Covering both display 208 and frame portion 210 is transparent cover 212, which is made of a transparent material such as glass or plastic. Transparent cover 212 may have a polished top surface, as shown in FIG. 2, or it may have a textured look and feel. Methods described herein can be used to provide frame portion 210 a metallic look such that frame portion 210 matches one or both metal back portion 204 or metal side portions 206.

Mobile phone includes RF antennas 214 positioned within housing 202. Antennas 214 transmit and receive RF signals to and from mobile device 200. In order to allow transmission of RF signals, RF windows 216 that cover antennas 214 are made of RF transparent material. Typical RF window 216 materials are non-conductive materials such as glass, plastic or ceramic. Methods described herein can be used to provide RF windows 216 a metallic look to match one or both metal back portion 204 or side portions 206.

Note that FIGS. 1 and 2 are provided as merely exemplary implementations of the techniques described herein. The techniques provided herein can be used to provide metallic looking surfaces in any suitable structures and devices. For example, methods described herein can be used to form metallic looking surfaces to stand-alone track pads that have Bluetooth connectivity to associated computing devices. The metallic looking surface will be non-conductive allowing for track pad operation, as described above with reference to FIG. 1, and will allow Bluetooth wireless transmission to and from an associated computing device. In addition, the methods described herein can be used to form metallic looking surfaces in portions of a structure that requires low thermal capacitance. For example, the metallic looking surfaces can be part of a non-metallic structure, such as structure made of carbon fiber or fiberglass.

Figure 3:
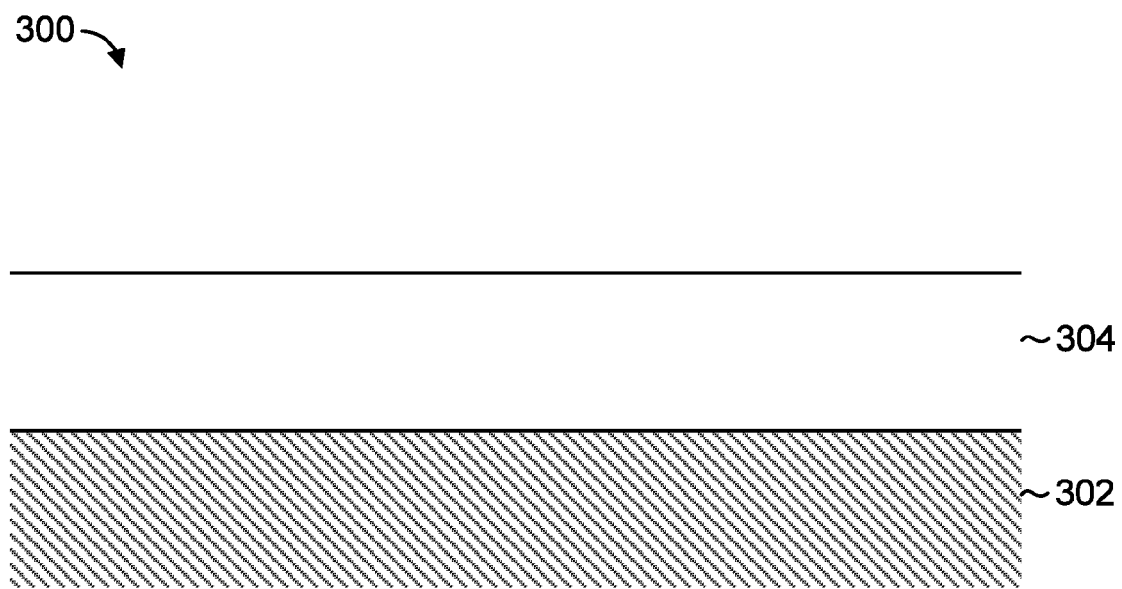
FIG. 3 shows a cross-section view of a portion of a metal surface of part.

External metal surfaces of parts, such as the metal surfaces of devices 100 and 200 described above, generally have a very thin coating of metal oxide in order to increase corrosion resistance and wear resistance of the metal surfaces. To illustrate, FIG. 3 shows a close-up cross-section view of a metal surface portion of part 300. Part 300 includes metal substrate 302, which has a protective oxide layer 304 formed thereon. Oxide layer 304 can be formed using an anodizing process. During anodizing, metal substrate 302 is exposed to an electrolytic process that converts exposed portions of metal substrate 302 to a corresponding metal oxide. For example, aluminum and aluminum alloy substrates can be anodized to form an aluminum oxide coating. Examples of anodizable metal substrates include aluminum, titanium, magnesium, niobium, zirconium, hafnium, tantalum, and alloys made thereof.

Although oxide layer 304 is generally very thin, typically about 5 to 20 micrometers, the presence of oxide layer 304 can slightly change the optical properties of the surface of part 300. In some cases, oxide layer 302 is substantially transparent, thereby revealing underlying metal substrate 302 and giving part 300 a mostly metallic look with a slightly muted appearance. In some cases, oxide layer 304 is dyed to have a particular color. In some cases, the colored oxide layer is partially transparent such that a portion of underlying metal substrate 302 is viewable through oxide layer 304, giving part 300 a colored metallic appearance. The methods described herein can be used to form a composite structure that has the visual appearance of metal substrate 302 with oxide layer 304 formed thereon, while having other different physical properties than metal substrate 302 with oxide layer 304. For example, the composite structure can have different capacitive (electrical and/or thermal) and/or RF transmission properties than metal substrate 302 with oxide layer 304. The composite structure can be formed adjacent to metallic portions of a part to give the part a uniform metallic appearance.

Figure 8A:
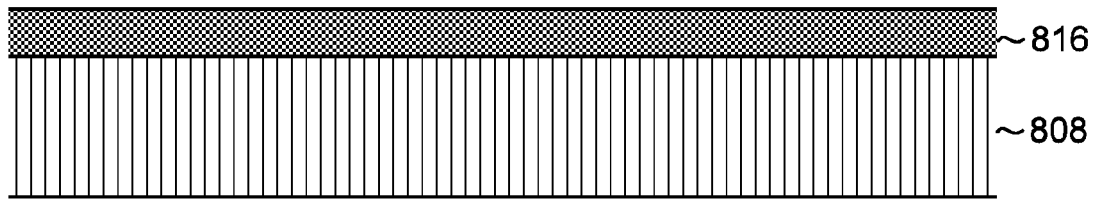
FIGS. 8A-8B show cross-section views showing formation of an anodized metal appearing composite structure using an imitation metal oxide layer.
Figure 8B:
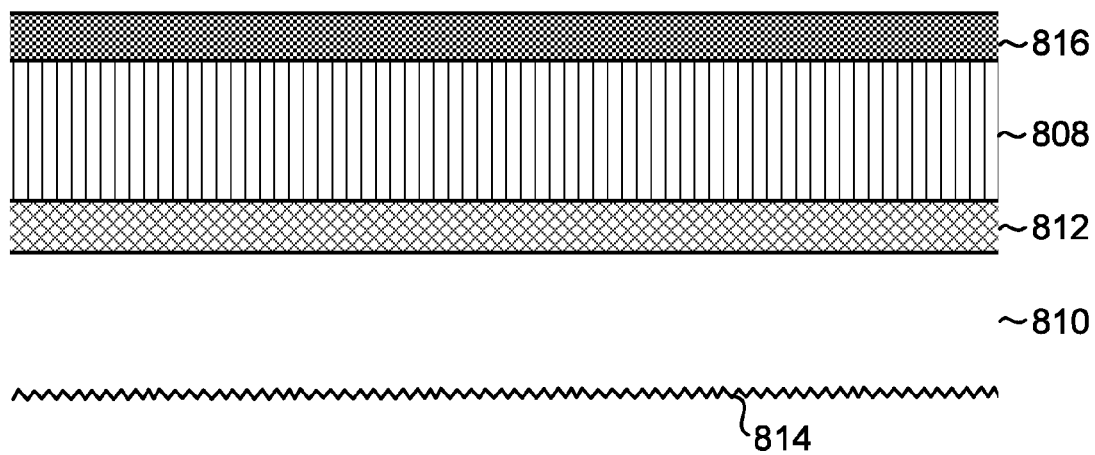
Figure 9:
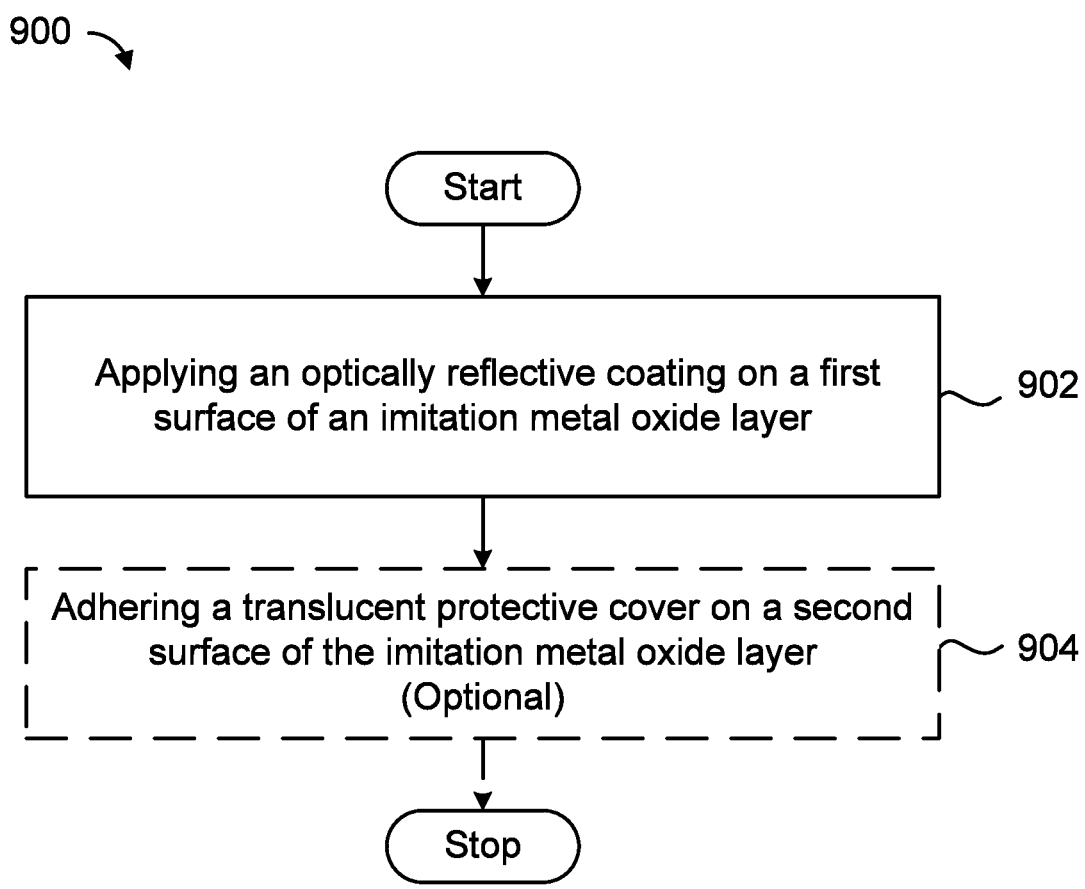
FIG. 9 shows a flowchart indicating a general procedure for forming an anodized metal appearing composite structure that includes an imitation metal oxide layer.

In some embodiments, an anodized metal appearing composite structure is formed by converting a portion of a metal substrate to metal oxide layer, and then stripping away the remaining metal. In some embodiments, the remaining metal is removed by exposure to a stripping solution, which is described below in detail. The backside of the stripped oxide layer is then coated with an optically reflective layer. The optically reflective layer can be in any suitable form, including liquid form (e.g., paint or ink), powder form, gas form, or a combination thereof. The optically reflective layer can be applied using any suitable technique, including a brush-on or spin-on technique. In some embodiments, the optically reflective layer is applied on using one or more of a physical vapor deposition (PVD), chemical vapor deposition (CVD) and non-conductive vacuum metallizing (NCVM) technique. The underlying reflective paint or ink is visible through the oxide layer and gives the composite structure the look of anodized metal. In other embodiments, the reflective paint or ink is deposited on an imitation metal oxide layer made of a non-conductive material such as a polymer material. FIGS. 4-7 described below are related to methods involving formation of a metal oxide layer. FIGS. 8-9 described below are related to methods involving use of an imitation metal oxide layer.

Figure 4A:
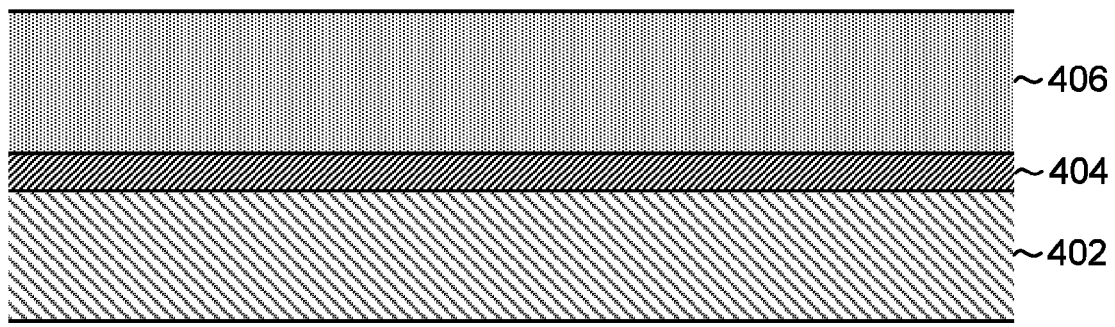
FIGS. 4A-4F are cross-section views showing formation of an anodized metal appearing composite structure involving the formation of a metal oxide layer.

FIGS. 4A-4F are cross-section views showing formation of an anodized metal appearing composite structure 400 using methods in accordance with some embodiments. FIG. 4A shows metal layer 402 that is optionally adhered to support backer 406 using temporary adhesive 404. Metal layer 402 can be made of any suitable anodizable metal material, such as aluminum or an aluminum alloy. A particular alloy mixture or grade of material can be chosen for metal layer 402 in order to provide a particular final cosmetic appearance. Metal layer 402 can have any suitable surface finish, including a smooth polished surface or textured surface.

Metal layer 402 can have any suitable thickness. As will be described later below, it can be desirable to have a very thin metal layer 402. However, if a subsequent anodizing process is used to convert a portion of metal layer 402 to metal oxide, metal layer 402 should have at least a minimum thickness sufficient to conduct electricity during the anodizing reaction. In some embodiments, a minimum thickness of about 3 micrometers is necessary for sufficient conversion during an anodizing process. In some embodiments, a very thin metal layer 402, ranging from about 3 micrometers to about 50 micrometers, is used. In other embodiments, a thicker metal layer 402 having a thickness of more than about 50 micrometers, is used. In some embodiments, metal layer 402 has a thickness of about 200 micrometers or more. Optional support backer 406 can be used to temporarily provide structural support for metal layer 402 in cases where metal layer 402 is thin, such as a very thin foil that can be difficult to handle alone without deformation. In some cases, it is advantageous to use optional support backer 406 when metal layer 402 is less than about 50 micrometers. In other embodiments, metal layer 402 is sufficiently thick that support backer 406 is not used. For example, metal layer 402 can be one or more inches thick and later milled or polished down to a desired thickness. Support backer can be made of any suitable material, such as plastic. In some embodiment, support backer 406 is made of a flexible material to make subsequent removal of support backer 406 easier.

Figure 4B:
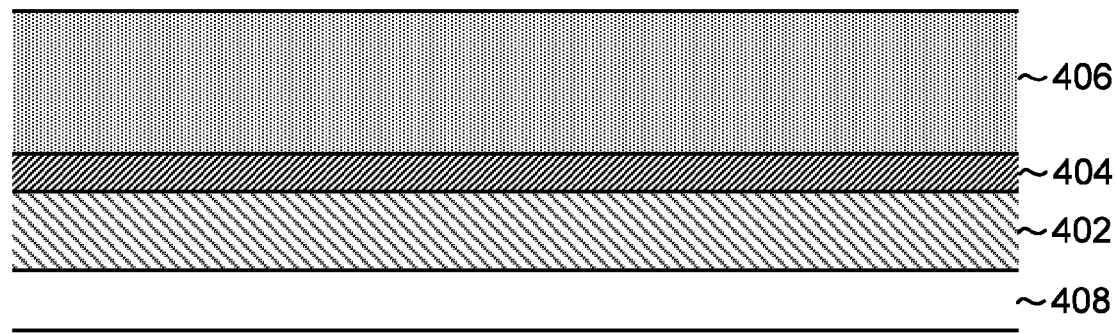

At FIG. 4B, a portion of metal layer 402 is converted to metal oxide layer 408. In some embodiments, an anodizing process is used to convert the portion of metal layer 402 to metal oxide layer 408. Note that in other embodiments, substantially all of metal layer 402 is converted to metal oxide layer 408. The anodizing process can be tuned to give metal oxide layer 408 a predetermined hardness. In some embodiments, the anodizing process is tuned to make a relatively soft metal oxide layer 408. A relatively soft metal oxide can be more flexible and more resistant to cracking during handling than a hard metal oxide. For example, in some applications, the metal oxide layer 408 and metal layer 402 are applied to a part using a roll-to-roll process, whereby metal oxide layer 408 would be subject to considerable stress. However, a soft metal oxide may not be hard enough for applications where metal oxide layer 408 is an external surface of a part, such as a housing. On the other hand, a relatively soft metal oxide may be acceptable in applications where metal oxide layer 408 is not at the external surface of the part. For example, metal oxide layer can be covered with a protective cover, such as a glass or plastic protective cover. In other embodiments where a protective cover is not used, the anodizing process can be tuned to provide a relatively hard metal oxide layer 408. The hard oxide may be more prone to cracking due to handling during the manufacturing process but may be more suitable for forming an external surface of a part. Metal oxide layer 408 can be at least partially transparent to allow visible light to shine through metal oxide layer 408. In some embodiments, metal oxide layer 408 is sufficiently transparent such that metal layer 402 is viewable through metal oxide layer 408. In some embodiments, metal oxide layer 408 is dyed to have a predetermined color. In some embodiments, the dye imparts a color to metal oxide layer 408 while still allowing some visible light to shine through metal oxide layer 408. Any suitable dye can be used, including suitable organic and inorganic dyes. Additionally, an electrolytic dyeing process can be used, whereby metal, such as tin, is deposited at the base of the anodizing pore structure of metal oxide layer 408 to impart an especially lightfast color to metal oxide layer 408.

Figure 4C:
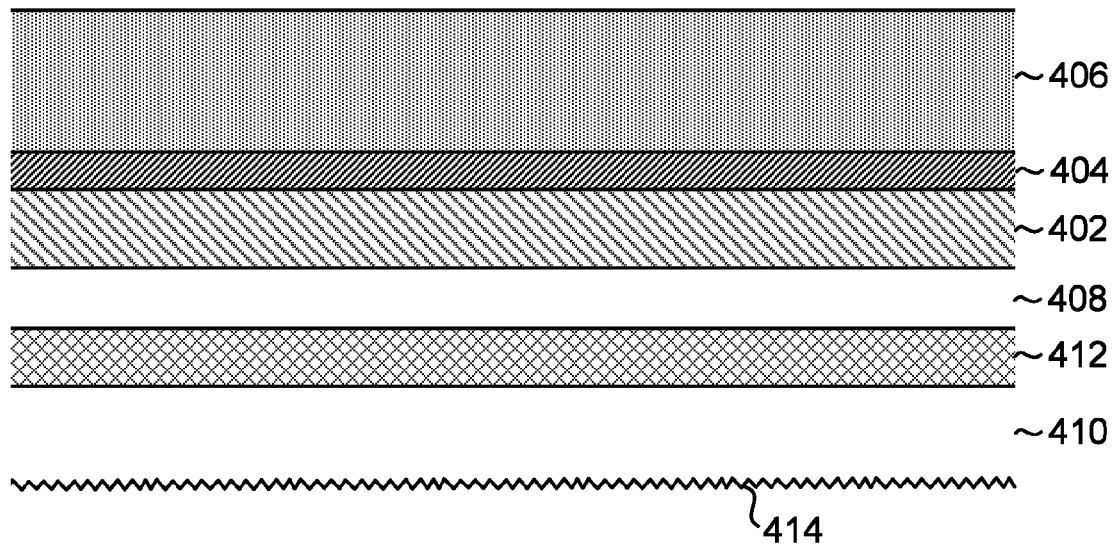

At FIG. 4C, a protective cover 410 is adhered to metal oxide layer 408 using adhesive 412. Protective cover 410 can be substantially transparent or translucent to visible light in order to allow visibility of metal oxide layer 408. Surface 414 of protective cover 410 can correspond to an outer surface of an electronic device, such as the user-facing surface of touch pad 108 of laptop computer 100 shown in FIG. 1. Adhesive 412 can be a substantially permanent adhesive that is designed to adhere protective cover 410 to metal oxide layer 408 in a final product. In some cases, adhesive 412 is an optically clear adhesive, such as a liquid optically clear adhesive. In some embodiments, protective cover 410 is made of a non-conductive material such as glass or plastic. In some embodiments, protective cover 410 has a textured surface 414. Textured surface 414 can be formed using a blasting or etching process to give textured surface 414 a predetermined roughness. In some cases, textured surface 414 has a roughness sufficient to diffuse some visible light such that underlying metal oxide layer 408 does not appear as a discrete layer that is separate from protective cover 410. In other embodiments, protective cover 410 has a smooth or polished surface.

Figure 4D:
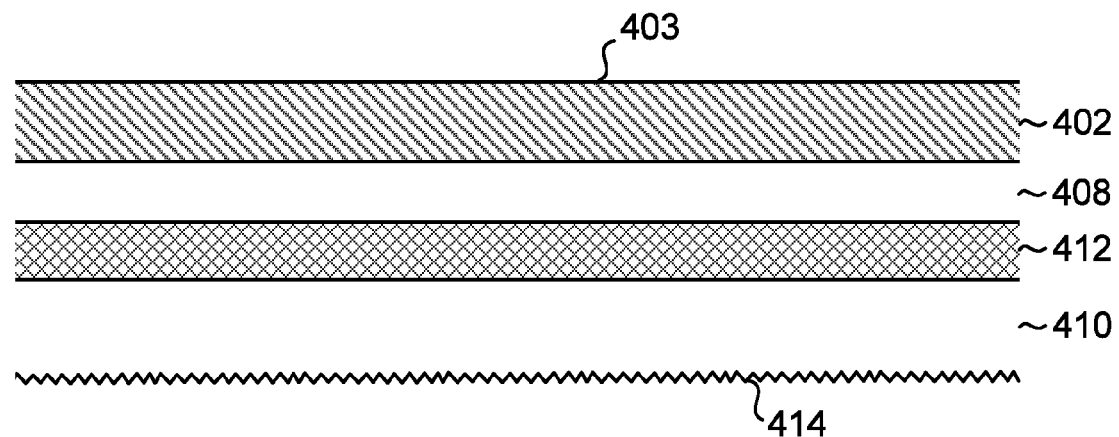

At FIG. 4D, optional support backer 406 and temporary adhesive 404 are removed. Since metal layer 402 is adhered to protective cover 410, support backer 406 is no longer necessary to support metal layer 402. In some cases, surface 403 can be cleaned in order to remove residues from temporary adhesive 404. In addition, metal layer 402 can optionally be cleaned using, for example, a degreasing rinse, an optional caustic etch rinse (e.g., NaOH 75 g/L), and an optional de-smutting rinse (e.g., 20% Nitric Acid) followed by subsequent water rinses. The caustic etch can remove residual oxides from the surface 403, preparing it for a subsequent stripping operation. Care can be taken to make sure exposure time to the caustic etchant is not so long as to fully dissolve metal layer 402 and metal oxide layer 408. At this point, the stack up of protective cover 410, adhesive 412, metal oxide layer 408 and metal layer 402 can be cut to an appropriate final size. For example, the stack up can be cut to a size corresponding to track pad 108 of the laptop of FIG. 1 described above. Note that cutting at this stage is optional and that cutting/trimming can occur at any suitable stage.

Figure 4E:
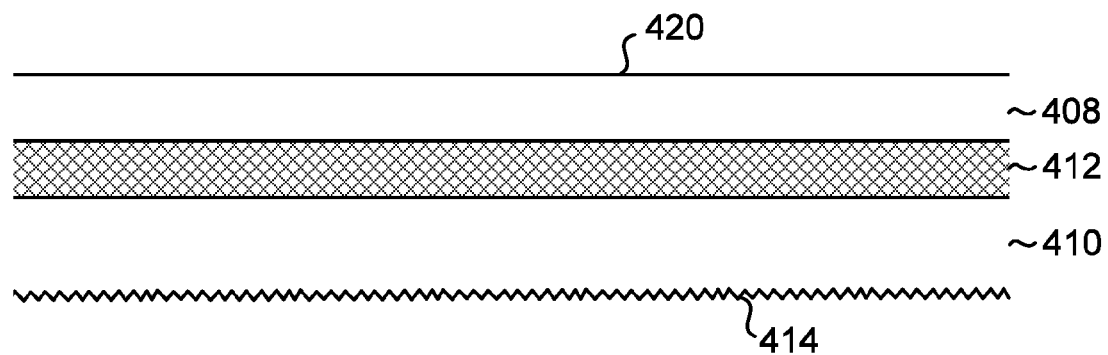

At FIG. 4E, metal layer 402 is removed, leaving surface 420 of metal oxide layer 408 exposed. In some embodiments, a stripping solution is used to dissolve away metal layer 402. The stripping solution can be a selective etchant that selectively dissolves metal layer 402 while not substantially dissolving any of metal oxide layer 408. Chemical composition and exposure time can be chosen to optimize removal of metal layer 402 without removal of metal oxide layer 408. In some embodiments where metal layer 402 includes aluminum, the stripping solution includes a hydrochloric acid and copper chloride. In a specific embodiment, between about 7% HCl in about a 0.1 M $CuCl_2$ solution was used. As mentioned above with reference to FIG. 4A, it can be desirable to start out with a very thin metal layer 402 so that removal of metal layer 402 is more efficient. That is, the etching process can be more efficient if only a thin metal layer 402 is left to remove. In some embodiments, a majority portion of metal layer 402 is converted to metal oxide layer 408 (FIG. 4B) in order to reduce the amount of metal layer 402 to be removed. After the metal layer 402 is removed, surface 420 can be rinsed with water and dried.

Figure 4F:
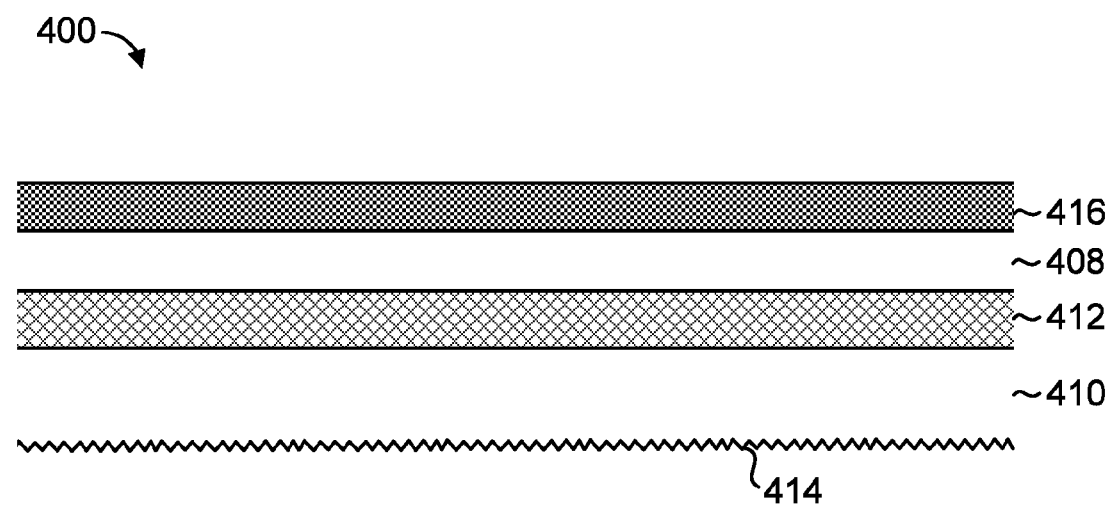

At FIG. 4F, reflective layer 416 is deposited on surface 420 of metal oxide layer 408, forming composite structure 400. Reflective layer 416 can be made of an optically reflective material but that is substantially non-capacitive and/or RF transparent. Reflective layer 416 simulates the appearance of a metal surface as viewed through metal oxide layer 408, adhesive 412 and protective cover 410. In some embodiments, reflective layer 416 includes ink or pigment that has metal flakes or mica flakes dispersed therein. The metal or mica flakes provide multiple visible light reflective surfaces that can be seen through metal oxide layer 408, but does not create a bulk capacitive material or an RF-blocking material. Additionally, the metal flakes or mica flakes can create a textured look to reflective layer 416, thereby simulating the look of a textured anodized layer. In some embodiments, an encapsulated metal flake ink is used, wherein the metal flakes are encapsulated within non-conductive material, such as silica. The encapsulated metal flakes are not able to form a bulk capacitive material or an RF-blocking material, and thus do not create a capacitive barrier or an RF-blocking barrier.

In some embodiments, reflective layer 416 includes a metallic or non-metallic coating that is applied using PVD, CVD and/or NCVM methods. The PVD, CVD or NCVM methods can provide a thin reflective layer 416 that conforms to the shape of surface 420. Suitable metallic materials can include highly reflective metals such as tin or aluminum. The metallic material can be applied very thinly so that an RF obstructing layer is not formed. Suitable non-metallic materials can include metal oxides such as alumina or titania. In some embodiments, combinations of metallic and non-metallic materials are deposited on surface 420. After reflective layer 416 is applied to metal oxide layer 408, composite structure 400 can be manufactured into a final part. For example, returning to FIG. 1, composite structure 400 can form the top surface of track pad 108 of laptop 100. Composite structure 400 can be made to match the visual appearance of metal top case 110 yet be substantially non-capacitive to allow proper operation of track pad 108. Returning to FIG. 2, composite structure 400 can form frame portion 210 of the front of phone 200 to match the appearance of metal back portion 204 and/or side portions 206. If designed to be RF transparent, composite structure 400 can be used to form RF windows 216, giving RF windows 216 a metallic look while allowing RF transmission therethrough. Note that composite structure 400 can be designed to be non-capacitive, RF transparent, or both.

In some embodiments, the metal oxide layer can be textured to have a textured appearance and giving the final composite material a different appearance than a smooth metal oxide layer described above with reference to FIGS. 4A-4F. FIGS. 5A-5G are cross-section views showing formation of an anodized metal appearing composite structure 500 involving formation of a textured metal oxide layer. At FIG. 5A, metal layer 502 is optionally adhered to support backer 506 using temporary adhesive 504. Support backer 506 is optionally used to temporarily provide structural support for metal layer 502, especially if metal layer 502 is very thin, similar to described above with reference to FIGS. 4A-4F.

Figure 5A:
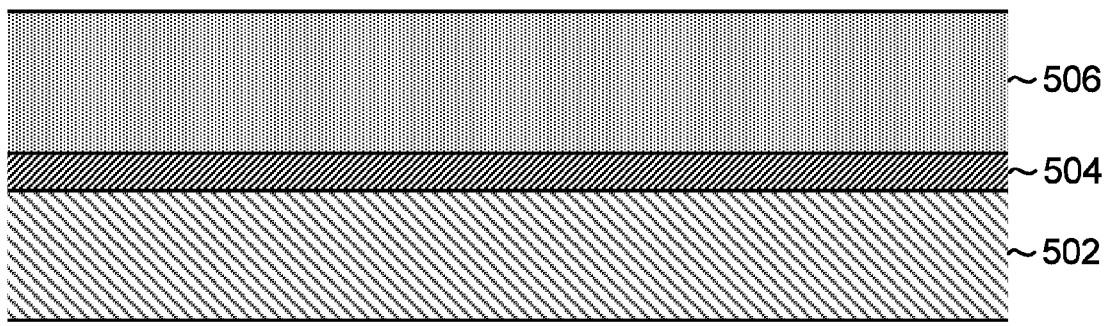
FIGS. 5A-5G are cross-section views showing formation of an anodized metal appearing composite structure involving the formation of a metal oxide layer having a textured surface.
Figure 5B:
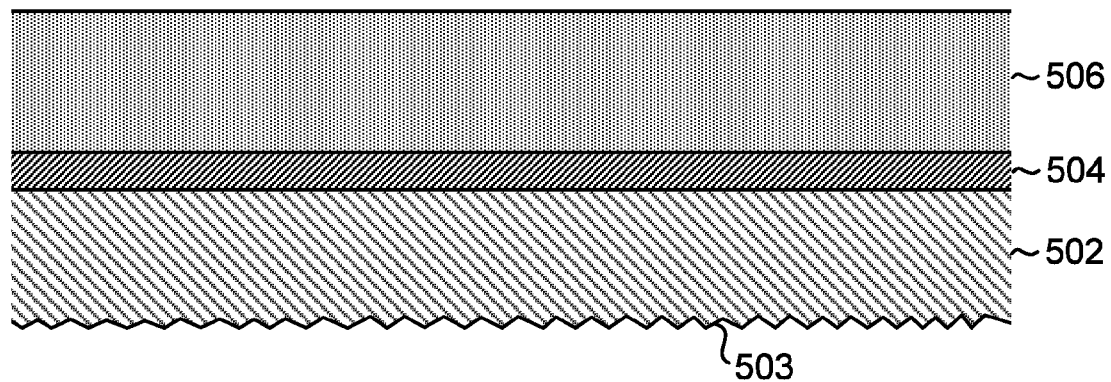

At FIG. 5B, a texturing process is applied to metal layer 502, forming scalloped surface 503. Any suitable texturing process can be used. In some embodiments, a blasting process is used whereby a blasting medium is impinged at high pressure onto metal layer 502. In some embodiments, a chemical etching process is used whereby metal layer 502 is exposed to an etching solution. Generally, blasting processes create rougher surfaces than chemical etching processes. In some embodiments, scalloped surface 503 is formed using both a blasting and an etching process. Metal layer 502 can be made of any suitable anodizable metal material, such as aluminum or an aluminum alloy, and can be any suitable thickness. Note that in some embodiments, scalloped surface 503 is applied to metal layer 502 prior to adhesion to support backer 506.

Figure 5C:
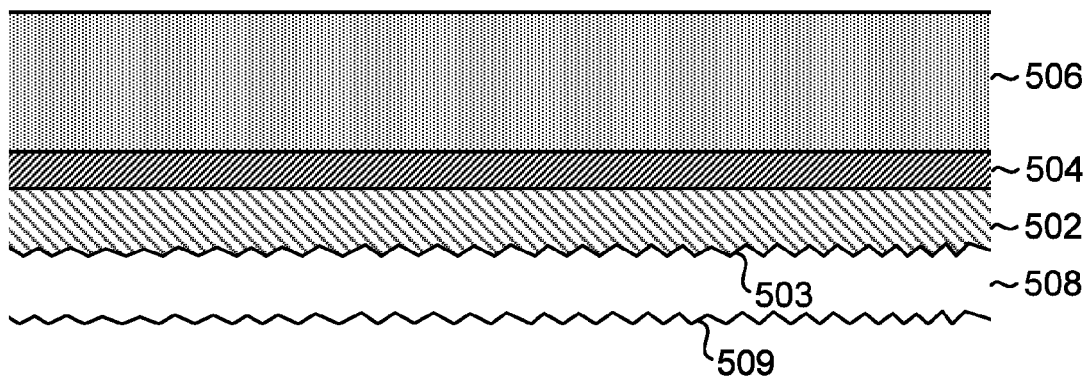

At FIG. 5C, a portion of metal layer 502 is converted to metal oxide layer 508. In other embodiments, substantially all of metal layer 502 is converted to metal oxide layer 508. An anodizing process can be tuned to give metal oxide layer 508 a predetermined hardness. In some embodiments, metal oxide layer 508 is dyed to give metal oxide layer 508 a predetermined color. Since metal layer 502 has scalloped surface 503, the conversion process results in metal oxide layer 508 having scalloped surface 509 corresponding to scalloped surface 503.

Figure 5D:
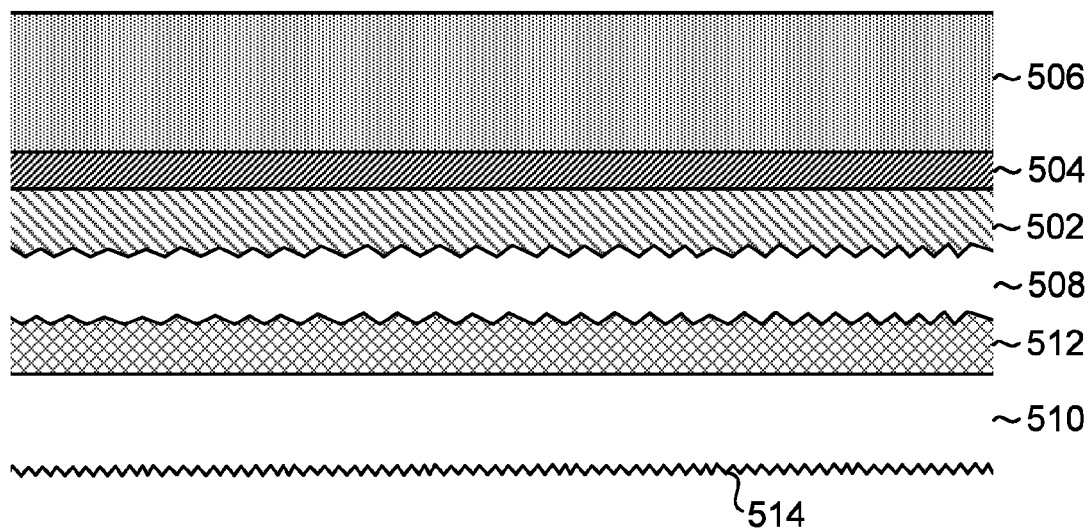
Figure 5E:
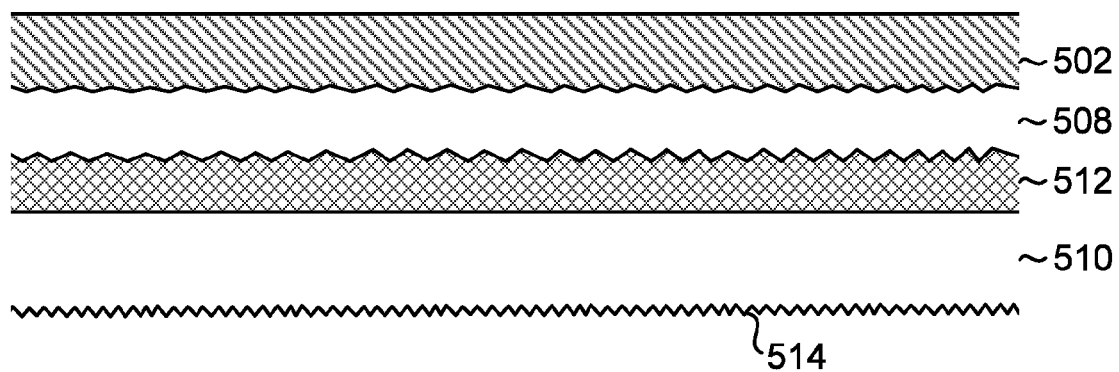

At FIG. 5D, metal oxide layer 508 is adhered to a protective cover 510 using adhesive 512. Protective cover 510 can be made of a non-conductive material such as glass or plastic. In some embodiments, protective cover 510 has a textured surface 514 that can be formed using a blasting or etching process. Textured surface 514 can break up incident light such that underlying metal oxide layer 508 does not appear as a discrete layer separate from protective cover 510. In other embodiments, protective cover 510 has a smooth or polished surface. At FIG. 5E, optional support backer 506 and temporary adhesive 504 are removed. In addition, the top surface of metal layer 502 can be optionally cleaned using one or more of a degreasing, etch rinse, de-smutting rinse and water rinse in preparation for a subsequent stripping operation.

Figure 5F:
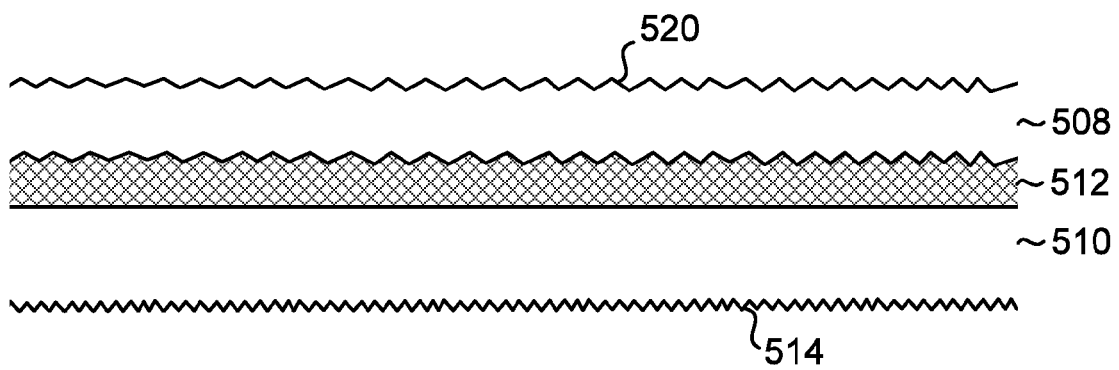

At FIG. 5F, metal layer 502 is removed exposing scalloped surface 520 of metal oxide layer 508. Metal layer 502 can be removed using any suitable technique, including a stripping process that selectively etches away metal layer 502 while leaving metal oxide layer 508 substantially intact. Similar to as described above with reference to FIG. 4E, a stripping solution containing hydrochloric acid and copper chloride can be used. Note that scalloped surface 520 corresponds to scalloped surface 503 of metal layer 502 prior to removal.

Figure 5G:
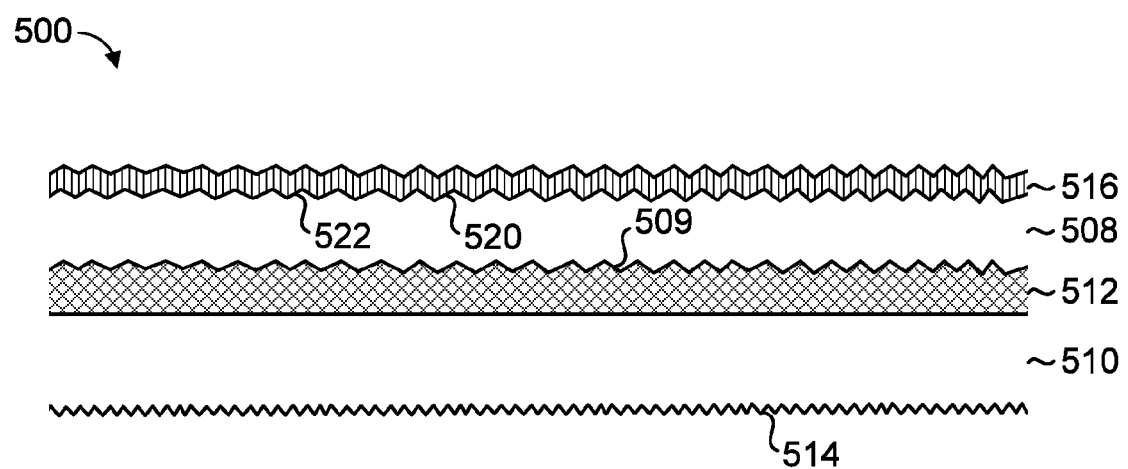

At FIG. 5G, reflective layer 516 is deposited on surface 520 of metal oxide layer 508, forming composite structure 500. Reflective layer 516 can be made of an optically reflective material, thereby simulating the appearance of an underlying metal surface, but that is substantially non-electrically capacitive and/or RF transparent. As shown, reflective layer 516 can be applied to metal oxide layer 508 such that reflective layer 516 conforms to the scalloped shape of surface 520, forming a corresponding scalloped surface 522 on reflective layer 516. In some embodiments, a PVD, CVD or NCVM process is used to conformally deposit reflective layer 516. Reflective layer 516 can include a metallic material, such as tin or aluminum, or non-metallic material, such as alumina or titania. In some embodiments, a paint or ink having reflective particles embedded therein is used. In some embodiments, reflective layer 516 includes both metallic and non-metallic materials. In some embodiments, reflective layer 516 includes metal flakes or mica flakes. Scalloped surface 522 has facets that simulate the look of a textured metal oxide layer when viewed through metal oxide layer 508, adhesive 512 and protective cover 510. If a paint or ink having reflective particles is used, reflective layer 516 will have light reflective surfaces independent of scalloped surface 522 that also add to the simulated textured metal look. Because composite structure 500 has scalloped surfaces 509 and 522, it can have a different appearance than composite structure 400 described above. In particular, one or both of scalloped surface 509 and 522 can reflect light incident on metal oxide layer 508 and give composite structure 500 the visual appearance of a blasted or chemically etched anodized metal. After reflective layer 516 is applied to metal oxide layer 508, composite structure 500 can be manufactured into a final part, such as device 100 or 200 described above with reference to FIGS. 1 and 2.

Figure 6A:
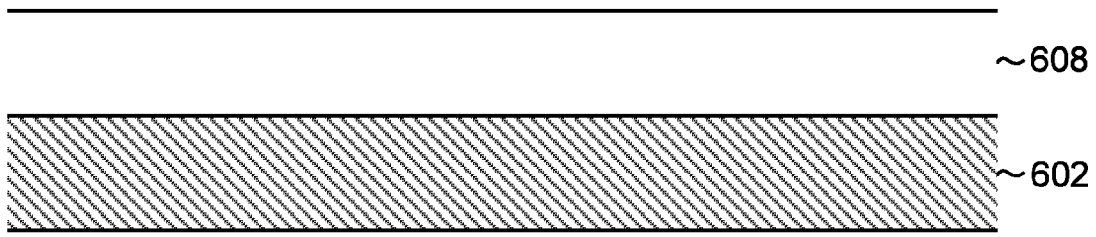
FIGS. 6A-6F are cross-section views showing formation of an anodized metal appearing composite structure without a protective cover.

In some cases, an anodized metal appearing composite structure is formed without a protective cover, such as protective covers 410 and 510 described above with reference to FIGS. 4A-4F and 5A-5G. The composite structure can be applied to a part as a veneer that gives the part a metallic look but does not interfere with RF transmission and/or does not have substantial electrical or thermal capacitance. FIGS. 6A-6E are cross-section views showing formation of an anodized metal appearing composite structure 600 without a protective cover. At FIG. 6A, shows a portion of metal layer 602 converted to metal oxide layer 608. In other embodiments, substantially all of metal layer 602 is converted to metal oxide layer 608. In some embodiments, an anodizing process is used to form metal oxide layer 608. In embodiments where no protective cover is used, it can be desirable to tune the anodizing process such that metal oxide layer 608 has a relatively high hardness compared to processes described above where a protective cover is adhered to the metal oxide layer. That is, the anodizing process can be tuned to give metal oxide layer 608 a sufficient hardness such that it can be applied an external surface of a part. In some embodiments, metal oxide layer 608 is also soft enough for handling without cracking. In some cases, a support backer (not shown) is used to support metal layer 602 during the conversion process. In some embodiments, metal layer 602 and metal oxide layer 608 can each be textured to have roughened surfaces, similar to as described above with reference to FIGS. 5A-5G. In some embodiments, metal oxide layer 608 is dyed to have a predetermined color.

Figure 6B:
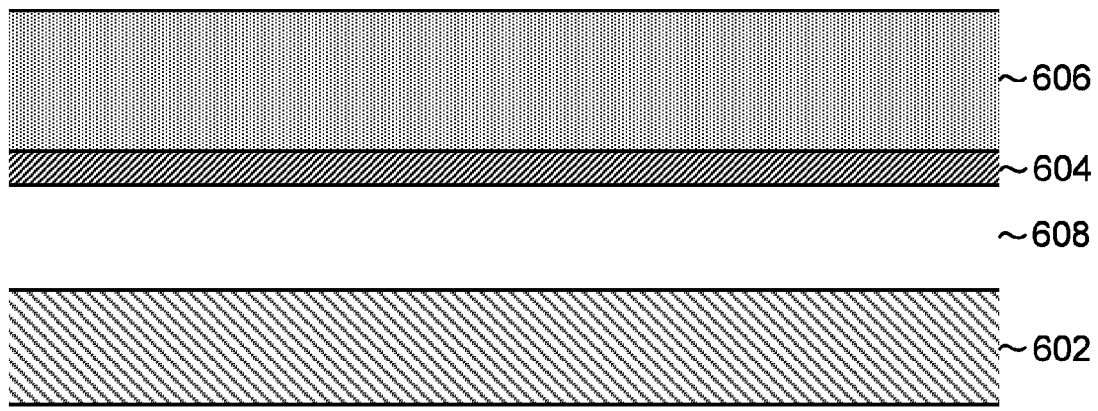
Figure 6C:
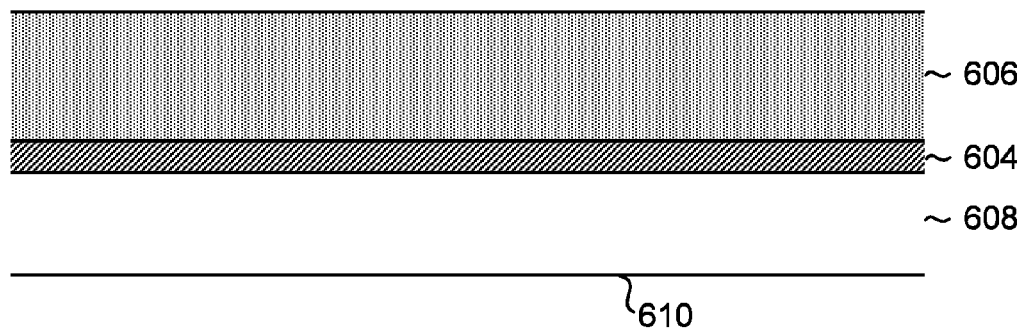
Figure 6D:
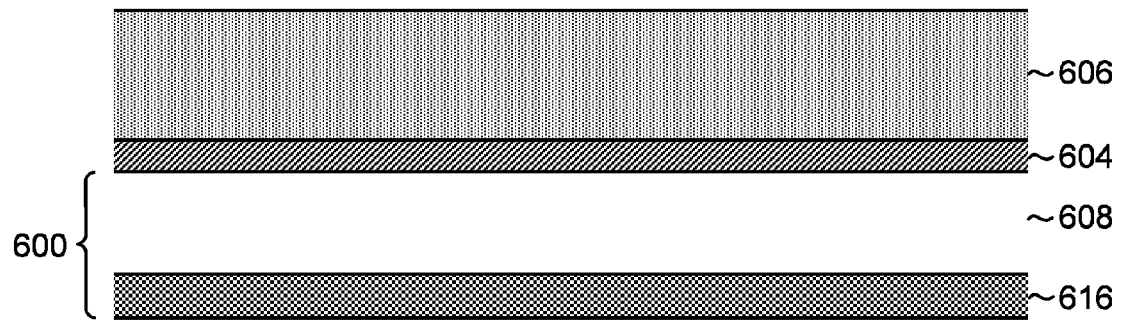

At FIG. 6B, liner 606 is adhered to metal oxide layer 608 using adhesive 604. Since metal oxide layer 608 is typically very thin, liner 606 temporarily supports metal oxide layer 608 during subsequent processing and during application onto a part. Adhesive 604 can be a temporary type of adhesive so that liner 606 can be removed. In addition, the unconverted surface of metal layer 602 can be optionally cleaned using one or more of a degreasing, etch rinse, de-smutting rinse and water rinse in preparation for a subsequent stripping operation. At FIG. 6C, metal layer 602 is removed using any suitable technique. As described above, a stripping solution that selectively etches away metal layer 602 that does not substantially remove any of metal oxide layer 608 can be used. After the metal removing process, surface 610 of metal oxide layer 608 is exposed. At FIG. 6D, reflective layer 616 is deposited on surface 610 of metal oxide layer 608 forming anodized metal appearing composite structure 600. Reflective layer 616 simulates the appearance of a metal surface as viewed through metal oxide layer 608 and can include one or more of a flaked ink (metal and/or mica) and metallic or non-metallic coating applied using PVD, CVD or NCVM. Composite structure 600, which includes metal oxide layer 608 and reflective layer 616, can be applied to a part with liner 606 adhered thereto. Composite structure 600 (along with liner 606) can be cut at this stage for shaping composite structure 600 to an appropriate size.

Figure 6E:
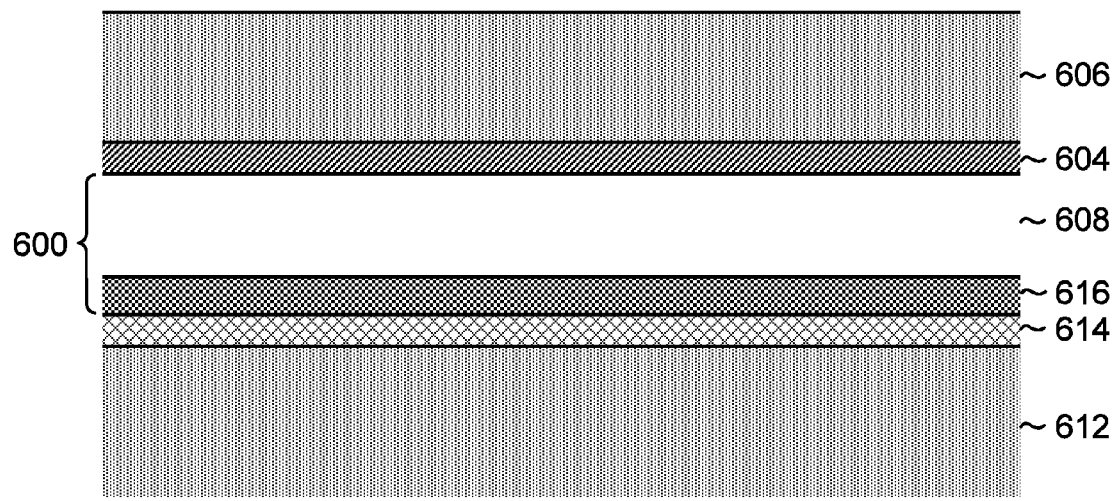
Figure 6F:
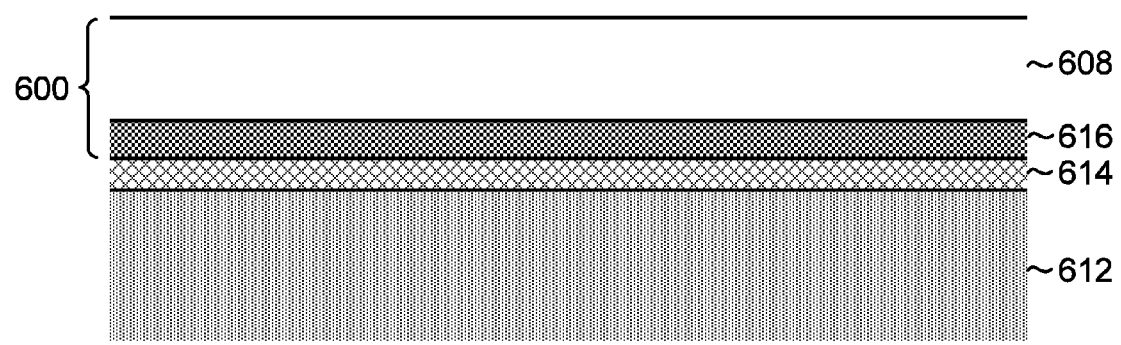

At FIG. 6E, composite structure 600 is applied to at least a portion of a surface of part 612 using adhesive 614. Typically, the portion of part 612 that composite structure 600 is applied to is a non-metallic surface, such as portion of housing that is proximate to an RF antenna, Bluetooth antenna and/or touch pad. For example the portion of part 612 covered by composite structure 600 can be made of glass, plastic, fiberglass, ceramic or mixture thereof. Adhesive 614 can be a substantially permanent type of adhesive and can be transparent or translucent. At FIG. 6F, liner 606 and adhesive 604 are removed leaving composite structure 600 adhered onto part 612. Composite structure 600 gives a portion or all of part 612 the appearance of an anodized metal surface while not having the RF blocking and/or electrical and/or thermal capacitance of bulk metal. Returning back to FIG. 2, composite structure 600 can be used to cover RF windows 216 such that RF windows 216 match the appearance of one or both metal back portion 204 or side portions 206. In other embodiments, composite structure 600 can be applied to an entire external surface of a part to give a metallic look to the entire part.

Figure 7:
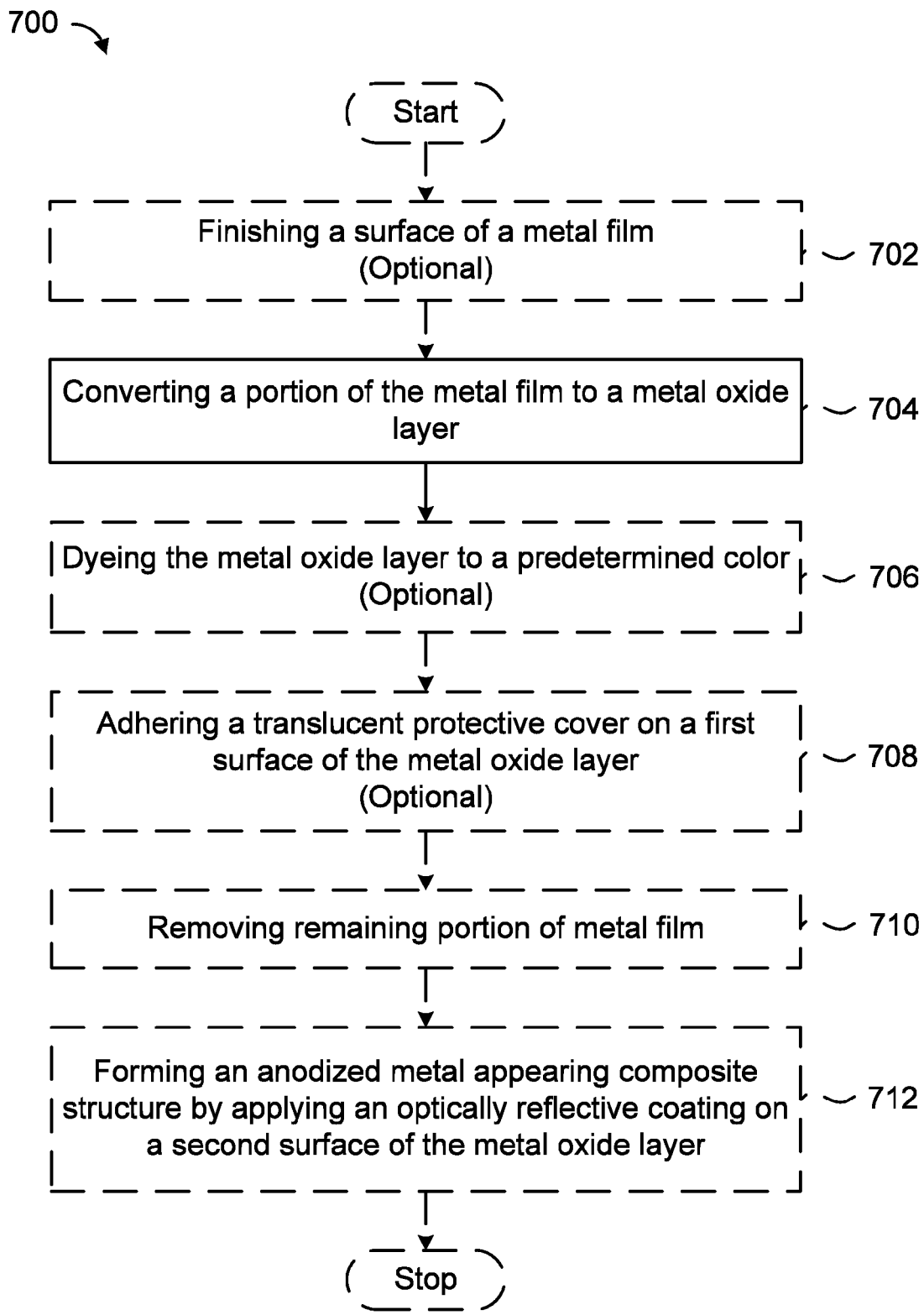
FIG. 7 shows a flowchart indicating a general procedure for forming an anodized metal appearing composite structure that includes formation of metal oxide layer.

FIG. 7 shows flowchart 700 indicating a general procedure for forming an anodized metal appearing composite structure that includes formation of metal oxide layer. At 702, a surface of a metal layer is optionally finished using a finishing process. In some embodiments, a polishing procedure is used to give the surface a smooth polished finish. In a particular embodiment, the surface is polished to a mirror shine. In other embodiments, the surface is textured using a texturing process such as a blasting or chemical etching process. At 704, at least a portion of the metal layer is converted to a corresponding metal oxide layer. In some embodiments, substantially the entire metal layer is converted to a metal oxide layer. The metal oxide layer will have a surface texture corresponding to the texture of the metal layer prior to the converting. For example, a textured metal layer will result in a metal oxide layer having a corresponding texture. Similarly, a polished and uniform metal layer will result in a metal oxide layer having a corresponding polished and uniform surface. In some embodiments, an anodizing process is used to form the metal oxide layer. The anodizing process can be tuned to give the metal oxide layer a predetermined hardness. The thickness of the metal oxide layer can depend in part on desired hardness and appearance of the metal oxide layer. In some embodiments, the metal oxide layer has thickness ranging from about 2 to about 50 micrometers. In some embodiments, the metal oxide layer has thickness ranging from about 5 to about 20 micrometers.

At 706, the metal oxide layer is optionally dyed to a predetermined color. The predetermined color can be a color that substantially matches a color of an anodized layer on a metal surface of a part. Any suitable dyeing process can be used, including infusion of organic or inorganic dyes within pores of the metal oxide layer. In some embodiments, an electrolytic dyeing process, as described above, is used. At 708, a translucent protective cover is adhered onto a first surface of the metal oxide layer. The protective cover can be made of any suitable material. In some embodiments, the protective cover is made of an RF transparent material and electrically non-capacitive material, such as glass, plastic, fiberglass, ceramic or a combination thereof. The protective cover can be applied onto the metal oxide layer using an adhesive, such as an optically clear adhesive. In some embodiments, the protective cover has a textured (e.g. blasted or chemically etched) surface. In some embodiments, the protective cover has a polished and smooth surface. In some embodiments, a portion of the protective cover is textured while another portion is polished and smooth. In some embodiments, the remaining portion (if any) of the metal layer after conversion to metal oxide is cleaned to remove residual oxides in preparation for a subsequent metal stripping operation.

At 710, the remaining portion (if any) of the metal layer is removed. In some embodiments, a stripping solution that selectively etches metal without substantially remove any of the metal oxide layer is used. In some embodiments where metal layer 402 includes aluminum, the stripping solution includes a hydrochloric acid and copper chloride. In a specific embodiment, between about 7% HCl in about a 0.1 M $CuCl_2$ solution was used. At 712, an anodized metal appearing composite structure is formed by applying an optically reflective coating on a second surface of the metal oxide layer. The anodized metal appearing composite structure can be manufactured onto a surface of a part to simulate the appearance of an anodized metal surface but with some different physical properties than an anodized bulk metal material. For example, the composite structure can be designed to have a lower electrical and/or thermal capacitance than an anodized bulk metal material. The composite structure can be designed to be more RF transparent an anodized bulk metal material. In some embodiments, the composite structure is designed to have a combination of two or more of low electrical capacitance, low thermal capacitance, and high RF transparency.

As described above, in some embodiments, an imitation metal oxide layer is used in place of a metal oxide material. An imitation metal oxide layer can give an anodized metal appearing composite structure a different appearance compared to using an actual metal oxide layer. FIGS. 8A-8B show cross-section views illustrating formation of an anodized metal appearing composite structure 800 using an imitation metal oxide layer. At FIG. 8A, reflective layer 816 is applied onto a first surface of imitation metal oxide layer 808. Imitation metal oxide layer 808 can be made of any suitable material that simulates the visual appearance of a metal oxide layer. In some embodiments, imitation metal oxide layer 808 is made of a translucent or transparent plastic, glass or ceramic material. Imitation metal oxide layer 808 can have a predetermined color, such as a color corresponding to the color of a dyed anodized metal surface of a part. In some embodiments, the material of imitation metal oxide layer 808 is chosen for its flexibility or hardness. In embodiments where a protective layer covers imitation metal oxide layer 808, the hardness of imitation metal oxide layer 808 may not need to be high. Similar to the metal oxide layer embodiments described above with reference to FIGS. 4-7, reflective layer 816 can simulate the appearance of a metal surface as viewed through imitation metal oxide layer 808. Reflective layer 816 can be made of an optically reflective material but that is substantially non-electrically capacitive, non-thermally capacitive and/or RF transparent. Examples of suitable optically reflective materials include, but are not limited to, pigments that have metal flakes or mica flakes, or thin conformally deposited metal or non-metal materials.

At FIG. 8B, a protective cover 810 is optionally adhered to a second surface of imitation metal oxide layer 808 using adhesive 812, forming composite structure 800. Protective cover 810 can be substantially transparent or translucent to visible light in order to allow visibility of imitation metal oxide layer 808. In some embodiments, protective cover 810 is made of a non-conductive material such as glass or plastic. In some embodiments, protective cover 810 has a textured surface 814 formed using, for example, a blasting or chemical etching process. Adhesive 812 can be an optically clear adhesive such that imitation metal oxide layer 808 is viewable. Composite structure 800 can be cut and manufactured into a final product, such as devices 100 and 200 of FIGS. 1 and 2.

FIG. 9 shows flowchart 900 indicating a general procedure for forming an anodized metal appearing composite structure that includes an imitation metal oxide layer. At 902, an optically reflective coating is applied onto a first surface of an imitation metal oxide layer. The imitation metal oxide layer can have the appearance of a metal oxide. Suitable materials for the imitation metal oxide layer include plastic, glass or ceramic. The reflective layer has the appearance of a metallic surface as viewed through the imitation metal oxide layer but does not have the capacitance and/or RF blocking capability of bulk metal material. Suitable materials for the reflective layer include metal containing-materials (e.g., flaked metal or mica inks) and non-metal containing materials.

At 904, a translucent or transparent protective cover is adhered onto a second surface of the imitation metal oxide layer. The protective cover can be any RF transparent and/or electrically non-capacitive material, such as glass, plastic, fiberglass, ceramic or a combination thereof. After 904 is complete, the anodized metal appearing composite structure can be manufactured into a part. Note that the order of steps 902 and 904 described above can be performed in any order. For example, the protective cover can be adhered to the second surface of the imitation metal oxide layer prior to applying the reflective layer to the first surface of the imitation metal oxide layer.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A part comprising:
   a non-electrically capacitive substrate; and
   a composite structure disposed on the non-electrically capacitive substrate, the composite structure comprising:
      a translucent metal oxide layer having a first surface proximate to the non-electrically capacitive substrate, and
      an optically reflective layer disposed on a second surface of the translucent metal oxide layer opposite the first surface, wherein the optically reflective layer includes ink having metal flakes dispersed therein and is non-electrically capacitive, wherein the metal flakes provide multiple light reflective surfaces such that the composite structure has an appearance of an anodized metal when viewed through the non-electrically capacitive substrate.

2. The part of claim 1, wherein the non-electrically capacitive substrate and the composite structure cover a sensor of the part.

3. The part of claim 1, wherein the metal flakes are encapsulated within non-conductive material.

4. The part of claim 1, wherein the second surface of the translucent metal oxide layer is scalloped such that the optically reflective layer disposed on the scalloped second surface gives the composite structure the appearance of a textured metal surface.

5. The part of claim 1, wherein the non-electrically capacitive substrate is adhered to the second surface of the translucent metal oxide layer with an adhesive.

6. The part of claim 1, wherein the composite structure is position proximate to an anodized metal portion of the part.

7. An electronic device comprising:
   a protective cover composed of a non-electrically capacitive material; and
   a composite structure coupled to the protective cover, the composite structure including:
      a translucent metal oxide layer having a first surface proximate to the protective cover, and
      an optically reflective layer disposed on a second surface of the translucent metal oxide layer opposite the first surface, the optically reflective layer including ink having metal flakes dispersed therein and being non-electrically capacitive, wherein the metal flakes reflect incident light such that the composite structure has an appearance of an anodized metal when viewed through the protective cover.

8. The electronic device of claim 7, wherein the protective cover and the composite structure are portions of a track pad assembly that cover a sensor of the electronic device.

9. The electronic device of claim 7, wherein the protective cover and the composite structure cover a radio frequency antenna of the electronic device.

10. A method of forming a part, the method comprising:
    forming a composite structure that includes an optically reflective layer disposed on a second surface of a translucent metal oxide layer, wherein the optically reflective layer includes ink having metal flakes dispersed therein and is non-electrically capacitive; and coupling a non-electrically capacitive substrate to a first surface of the translucent metal oxide layer opposite the second surface, wherein the metal flakes provide multiple light reflective surfaces such that the composite structure has an appearance of an anodized metal when viewed through the non-electrically capacitive substrate.

11. The method of claim 10, wherein the composite structure is radio frequency transparent.

12. The method of claim 10, further comprising:

forming a scalloped surface on a metal substrate prior to converting a portion of the metal substrate to the translucent metal oxide layer, wherein the converting forms a scalloped surface of the translucent metal oxide layer corresponding to the scalloped surface of the metal substrate.

13. The method of claim 12, wherein the scalloped surface of the optically reflective layer reflects light incident on the composite structure, thereby giving the composite structure a visual appearance of a textured anodized metal.

14. The method of claim 10, further comprising:

forming a uniform surface on a metal substrate prior to converting a portion of the metal substrate to the translucent metal oxide layer by polishing the metal substrate, wherein the converting forms a uniform surface of the translucent metal oxide layer corresponding to the uniform surface of the metal substrate.

15. The method of claim 10, further comprising:

dyeing the translucent metal oxide layer to have a predetermined color.

16. The method of claim 10, further comprising:

adhering the non-electrically capacitive substrate to the second surface of the translucent metal oxide layer using an adhesive.

17. The method of claim 16, wherein the non-electrically capacitive substrate is optically transparent.

18. The method of claim 10, further comprising:

converting a portion of a metal substrate to the translucent metal oxide layer; and removing an unconverted portion of the metal substrate from the translucent metal oxide layer, thereby exposing the second surface of the translucent metal oxide layer.

19. The method of claim 10, wherein forming the composite structure comprises applying the optically reflective layer on the second surface of the translucent metal oxide layer using one or more of a chemical vapor deposition, physical vapor deposition or non-conductive vacuum metallizing process.

20. The method of claim 19, wherein the metal flakes are encapsulated within non-conductive material.

* * * * *